US012625375B1

(12) United States Patent
Wang et al.

(10) Patent No.: US 12,625,375 B1
(45) Date of Patent: May 12, 2026

(54) DUAL SCREEN EXTENDED REALITY HEADSET DEVICE

(71) Applicant: FMR LLC, Boston, MA (US)

(72) Inventors: Hangyu Wang, Cary, NC (US); Yiming Li, Dalian (CN); Sai Priya Jyothula, Durham, NC (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 19/282,146

(22) Filed: Jul. 28, 2025

(51) Int. Cl.
*G02B 27/01* (2006.01)
*G06F 21/31* (2013.01)

(52) U.S. Cl.
CPC ......... *G02B 27/0172* (2013.01); *G06F 21/31* (2013.01)

(58) Field of Classification Search
CPC ............................ G02B 27/0172; G06F 21/31
See application file for complete search history.

(56) References Cited

U.S. PATENT DOCUMENTS

| | | | | |
|---|---|---|---|---|
| 2016/0093108 A1* | 3/2016 | Mao | ..................... | G02B 27/017 |
| | | | | 345/633 |
| 2018/0005429 A1* | 1/2018 | Osman | .................... | A63F 13/56 |
| 2022/0374073 A1* | 11/2022 | Wu | ......................... | G06T 13/40 |

* cited by examiner

*Primary Examiner* — Muhammad N Edun
(74) *Attorney, Agent, or Firm* — Cesari and McKenna, LLP

(57) ABSTRACT

Methods and apparatuses are described for a dual screen extended reality (XR) headset device, including a first display screen viewable by a wearer of the headset device and a second display screen on an external surface of the headset device and viewable by other persons in proximity to the wearer. The headset device generates a virtual environment for display to the wearer via the first display screen. The headset device captures data associated with execution of the software application, data associated with the virtual environment being displayed to the wearer, and data associated with the wearer. The headset device displays a user interface based upon at least a portion of the captured data on the second display screen, and detects input associated with the user interface displayed on the second display screen. The headset device updates the virtual environment and access to software features based upon the detected input.

24 Claims, 8 Drawing Sheets

100

130

Main body

Headstraps

102

100

200

Figure 3:
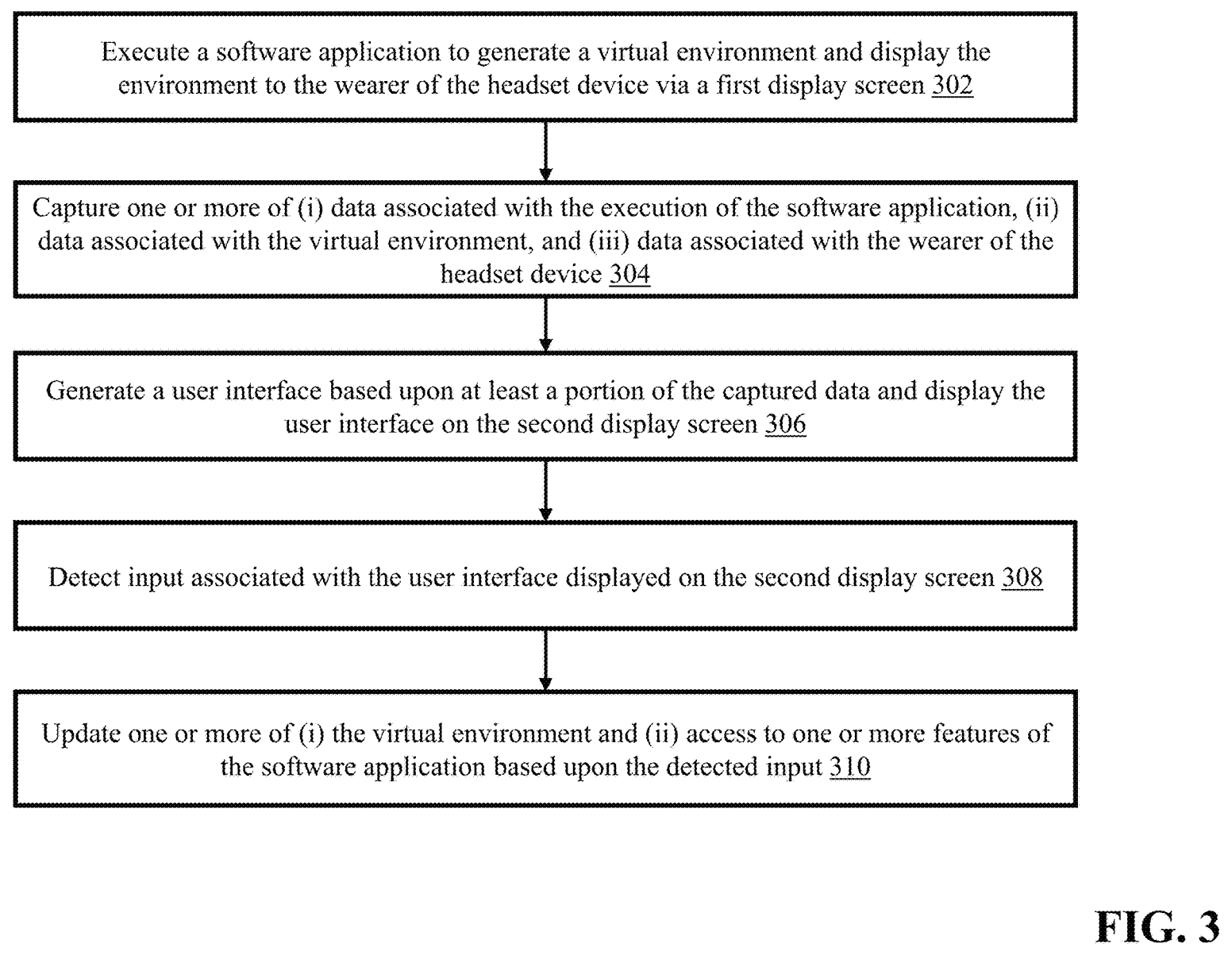

Execute a software application to generate a virtual environment and display the environment to the wearer of the headset device via a first display screen 302

Capture one or more of (i) data associated with the execution of the software application, (ii) data associated with the virtual environment, and (iii) data associated with the wearer of the headset device 304

Generate a user interface based upon at least a portion of the captured data and display the user interface on the second display screen 306

Detect input associated with the user interface displayed on the second display screen 308

Update one or more of (i) the virtual environment and (ii) access to one or more features of the software application based upon the detected input 310

ALERT

The user is
stuck in the
VR environment.

Please help them
reset.

408

Reset

402

404b

404a

404c

400

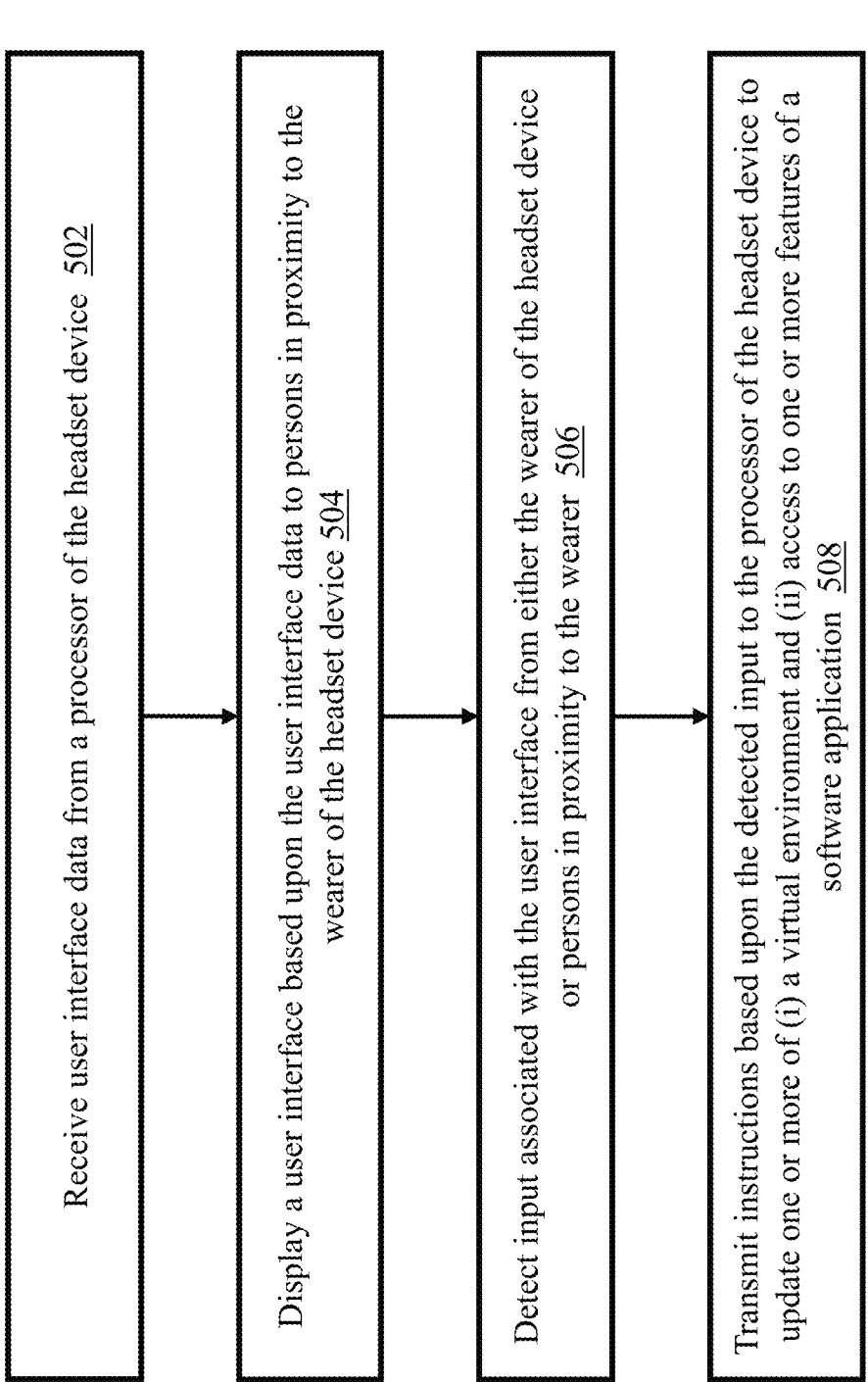

Receive user interface data from a processor of the headset device  502

Display a user interface based upon the user interface data to persons in proximity to the wearer of the headset device 504

Detect input associated with the user interface from either the wearer of the headset device or persons in proximity to the wearer  506

Transmit instructions based upon the detected input to the processor of the headset device to update one or more of (i) a virtual environment and (ii) access to one or more features of a software application 508

DUAL SCREEN EXTENDED REALITY HEADSET DEVICE

TECHNICAL FIELD

This application relates generally to methods and apparatuses, including computer program products, for a dual screen extended reality (XR) headset device and methods of operating same.

BACKGROUND

Generally, extended reality (XR) software applications provide for an experience in which a user's real-world viewing perspective is replaced by or enhanced with a virtual 3D environment. In the context of this application, the term "alternative reality" encompasses all different types of virtual experiences, including but not limited to virtual reality (VR), augmented reality (AR), mixed reality (MR), and others. A user wears a headset, glasses, or similar apparatus that includes specialized internal display devices to render the virtual environment to the user, and the headset can include certain components (e.g., gyroscope(s), accelerometer(s), magnetometer(s), etc.) that detect and capture the user's head movements in order to update the virtual environment in response to the movements in a seamless, real-time manner. Exemplary headsets comprise the Meta Quest™ 3S available from Meta Platforms, Inc., the Apple Vision Pro™ from Apple Inc., and the HTC Vive™ Pro 2 headset available from HTC Corp.

Most current-generation XR headset devices are limited to having a single display screen that is visible only to the person that is wearing the headset. This configuration limits the ability for others in proximity to the wearer to interact with the headset and/or view the virtual environment being displayed to the wearer. For example, the wearer may encounter difficulties in operating the headset device, launching or interacting with a software application installed on the headset device, or navigating through the virtual environment. An assistant may be in proximity to the wearer, in order to monitor the wearer and provide guidance and assistance as needed. Because the assistant cannot see the internal display screen, the assistant is unable to precisely determine the wearer's current state in relation to the virtual environment-which reduces the capability for the assistant to provide helpful input or troubleshooting. As a result, the wearer usually must remove the headset to get assistance, interrupting the user experience in the virtual environment.

Some headset devices, such as the Apple Vision Pro™, incorporate external display features that enable a person who is not wearing the headset to see certain visual aspects on the front of the device—e.g., a representation of the wearer's eyes, a boot indicator when powering up, or setup guidance during a persona configuration. However, these visual aspects are limited and do not provide any information on a virtual environment being displayed to the wearer or information regarding the operation of other application software that is executing on the headset device for the purpose of assisting the wearer. In addition, these types of display features lack a mechanism for the other person to interact with the headset device and provide instructions or commands to modify the operation of the headset device, the virtual environment, and/or the application software executing on the headset.

In addition, some XR software application workflows can be cumbersome or undesirable when using devices with a single internal display. As an example, typical authentication routines handled in XR software require a user to manually provide authentication credentials via a user interface displayed on the internal screen. Multi-factor authentication (MFA) routines are particularly problematic, because they often require a user to operate a separate computing device in responding to a secondary authentication challenge. A user wearing an XR headset must remove the headset to complete the MFA process, which degrades the immersion and natural flow of the virtual experience.

Existing solutions that attempt to overcome the above-described challenges may utilize screen casting techniques that replicate what the wearer sees on the headset device on a separate computing desktop or tablet device. However, this type of screen casting is typically not effective for aiding a headset wearer due to latency between the wearer's actions/experience and what is displayed on the secondary device. In addition, traditional screen casting systems do not provide the other person with a capability to interact with the headset device and provide instructions or commands to modify the operation of the headset device, the virtual environment, and/or the application software executing on the headset. Screen casting techniques also cannot be used effectively in an environment where a person is tasked with assisting multiple different headset wearers simultaneously.

SUMMARY

The methods and systems described herein overcome the above-described technical deficiencies using a dual screen XR headset device, which includes a second, externally-facing display screen that is either embedded in the headset device or attached as a separate apparatus to an exterior surface of the headset device. The externally-facing display screen is visible to other persons in proximity to the wearer of the headset device, and the screen can be configured to display data relating to operation of the headset device and/or software applications executing on the headset device to the other persons without interrupting the wearer's experience or requiring removal of the headset. In addition, the externally-facing display screen can receive input from the other persons (e.g., via touchscreen functionality) that the headset translates into programmatic instructions for modification of operation of the headset device and/or any software applications executing on the headset.

The invention, in one aspect, features an extended reality (XR) headset device comprising a first display screen embedded in the headset device and viewable by a wearer of the headset device; a second display screen integrated into an external surface of the headset device and viewable by one or more other persons in proximity to the wearer of the headset device; a memory that stores computer-executable instructions; and a processor that executes the computer-executable instructions. The headset device executes a software application to generate a virtual environment and display the virtual environment to the wearer of the headset device via the first display screen. The headset device captures one or more of (i) data associated with execution of the software application, (ii) data associated with the virtual environment being displayed to the wearer, and (iii) data associated with the wearer of the headset device. The headset device generates a user interface based upon at least a portion of the captured data and display the user interface on the second display screen. The headset device detects input associated with the user interface displayed on the second display screen. The headset device updates one or more of (i) the virtual environment and (ii) access to one or more features of the software application based upon the detected input.

The invention, in another aspect, features a computerized method of an extended reality (XR) headset device. The headset device executes a software application to generate a virtual environment and displays the virtual environment via a first display screen embedded in the headset device and viewable by a wearer of the headset device. The headset device captures one or more of (i) data associated with execution of the software application, (ii) data associated with the virtual environment being displayed to the wearer, and (iii) data associated with the wearer of the headset device. A second display screen integrated into an exterior surface of the headset device and viewable by one or more other persons in proximity to the wearer of the headset device generates a user interface based upon at least a portion of the captured data and displays the user interface on the second display screen. The headset device detects input associated with the user interface displayed on the second display screen. The headset device updates one or more of (i) the virtual environment and (ii) access to one or more features of the software application based upon the detected input.

The invention, in another aspect, features an extended reality (XR) headset device comprising a first display screen embedded in the headset device and viewable by a wearer of the headset device; a memory that stores computer-executable instructions; and a processor that executes the computer-executable instructions. The headset device executes a software application to generate a virtual environment and display the virtual environment via a first display screen embedded in the headset device and viewable by a wearer of the headset device. The headset device captures one or more of (i) data associated with execution of the software application, (ii) data associated with the virtual environment being displayed to the wearer, and (iii) data associated with the wearer of the headset device. The headset device generates user interface data based upon at least a portion of the captured data and transmits the user interface data to a second display screen attached to an exterior surface of the headset device and viewable by one or more other persons in proximity to the wearer of the headset device. The headset device receives input associated with the user interface data from the second display screen. The headset device updates one or more of (i) the virtual environment and (ii) access to one or more features of the software application based upon the detected input.

The invention, in another aspect, features a computerized method for an extended reality (XR) headset device. The headset device executes a software application to generate a virtual environment and displays the virtual environment via a first display screen embedded in the headset device and viewable by a wearer of the headset device. The headset device captures one or more of (i) data associated with execution of the software application, (ii) data associated with the virtual environment being displayed to the wearer, and (iii) data associated with the wearer of the headset device. The headset device generates user interface data based upon at least a portion of the captured data and transmits the user interface data to a second display screen attached to an exterior surface of the headset device and viewable by one or more other persons in proximity to the wearer of the headset device. The headset device receives input associated with the user interface data from the second display screen. The headset device updates one or more of (i) the virtual environment and (ii) access to one or more features of the software application based upon the detected input.

The invention, in another aspect, features a display screen device comprising a processor, a memory, and a network interface that communicates with a processor of an extended reality (XR) headset device. The display screen device is attached to an exterior surface of the headset device and viewable by one or more other persons in proximity to a wearer of the headset device. The display screen device is configured to receive user interface data from the processor of the headset device via the network interface. The display screen device is configured to display a user interface based on the user interface data to the one or more other persons in proximity to the wearer of the headset device. The display screen device is configured to detect input associated with the user interface from either the wearer of the headset device or the one or more other persons in proximity to the wearer of the headset device. The display screen device is configured to transmit instructions based upon the detected input to the processor of the headset device via the network interface to update one or more of (i) a virtual environment displayed by the XR headset device to the wearer of the headset device and (ii) access to one or more features of a software application executing on the headset device.

The invention, in another aspect, features a computerized method for a display screen device comprising a processor, a memory, and a network interface that communicates with a processor of an extended reality (XR) headset device. The display screen device is attached to an exterior surface of the headset device and viewable by one or more other persons in proximity to a wearer of the headset device. The display screen device is configured to receive user interface data from the processor of the headset device via the network interface. The display screen device is configured to display a user interface based on the user interface data to the one or more other persons in proximity to the wearer of the headset device. The display screen device is configured to detect input associated with the user interface from either the wearer of the headset device or the one or more other persons in proximity to the wearer of the headset device. The display screen device is configured to transmit instructions based upon the detected input to the processor of the headset device via the network interface to update one or more of (i) a virtual environment displayed by the XR headset device to the wearer of the headset device and (ii) access to one or more features of a software application executing on the headset device.

Any of the above aspects can include one or more of the following features. In some embodiments, the data associated with execution of the software application comprises a frame rate associated with the software application, processor usage associated with the software application, memory usage associated with the software application, network bandwidth usage associated with the software application, a version number of the software application, a time remaining associated with the software application, an application mode of the software application, a user role associated with the software application, a narrative progress of the software application, a state of the software application, and an error message associated with the software application. In some embodiments, the data associated with the virtual environment being displayed to the wearer comprises indicia associated with one or more objects in the virtual environment, indicia associated with one or more objects in the virtual environment, indicia associated with user position in the virtual environment, and indicia associated with user orientation in the virtual environment. In some embodiments, the data associated with the wearer of the headset device comprises input submitted by the wearer of the headset device to an interface of the headset device.

In some embodiments, the interface of the headset device comprises a microphone and the input submitted by the wearer comprises a spoken phrase. In some embodiments, the interface of the headset device comprises a user interface element displayed on the first display screen and the input submitted by the wearer comprises an interaction with the user interface element.

In some embodiments, the user interface displayed on the second display screen comprises a screen capture of the virtual environment as displayed to the wearer of the headset device via the first display screen. In some embodiments, the user interface displayed on the second display screen comprises a user interface element requesting input from the one or more other persons in proximity to the wearer of the headset device. In some embodiments, the user interface displayed on the second display screen comprises status indicia associated with one or more of the software application, the virtual environment, and the wearer of the headset device. In some embodiments, the input associated with the user interface displayed on the second display screen comprises one or more of a touch interaction and a scan interaction with the second display screen by either the wearer of the headset device or the one or more other persons in proximity to the wearer of the headset device.

In some embodiments, updating access to one or more features of the software application based upon the detected input comprises authenticating the wearer of the headset device based upon the touch interaction or the scan interaction; and enabling access to the one or more features of the software application based upon the authentication of the wearer. In some embodiments, updating access to one or more features of the software application based upon the detected input comprises modifying one or more objects in the virtual environment.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 3 is a flow diagram of a computerized method of operation of an XR headset device with an embedded external-facing second display screen.

FIG. 5 is a flow diagram of a computerized method of operation of an XR headset device that is coupled to a separate apparatus comprising an external-facing display screen.

DETAILED DESCRIPTION

Figure 1A:
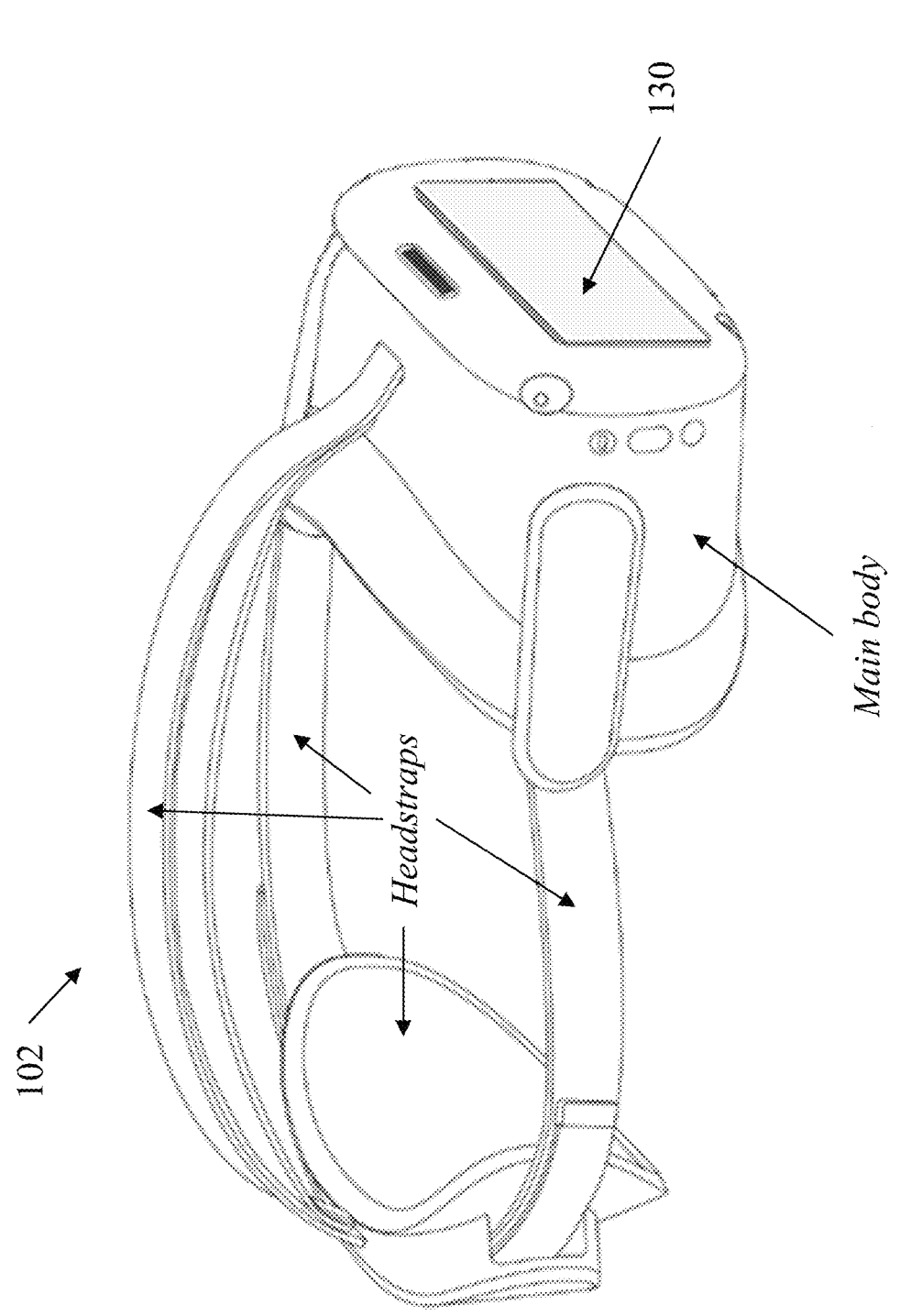
FIG. 1A is a diagram of a dual screen extended reality (XR) headset device with an embedded second display screen.

FIG. 1A is a diagram of a dual screen extended reality (XR) headset device 102 with an embedded second display screen 130. As can be appreciated, the headset device 102 can be worn by a user by placing the device on his or her head using the headstraps so that the main body of the headset is aligned with the user's eyes. The user can view an internal display screen of the headset device 102 (via magnification lenses) that presents a virtual environment to the user. As shown in FIG. 1A, the second display screen 130 is integrated into the housing of the headset device 102 such that the display is part of the headset device and faces outward from the headset device 102. As a result, others in proximity to the wearer of the headset device can view and interact with the second display screen 130. In this embodiment, the second display screen 130 is connected to other internal hardware components of the headset device 102 (e.g., CPU, GPU, memory, etc.).

Figure 1B:
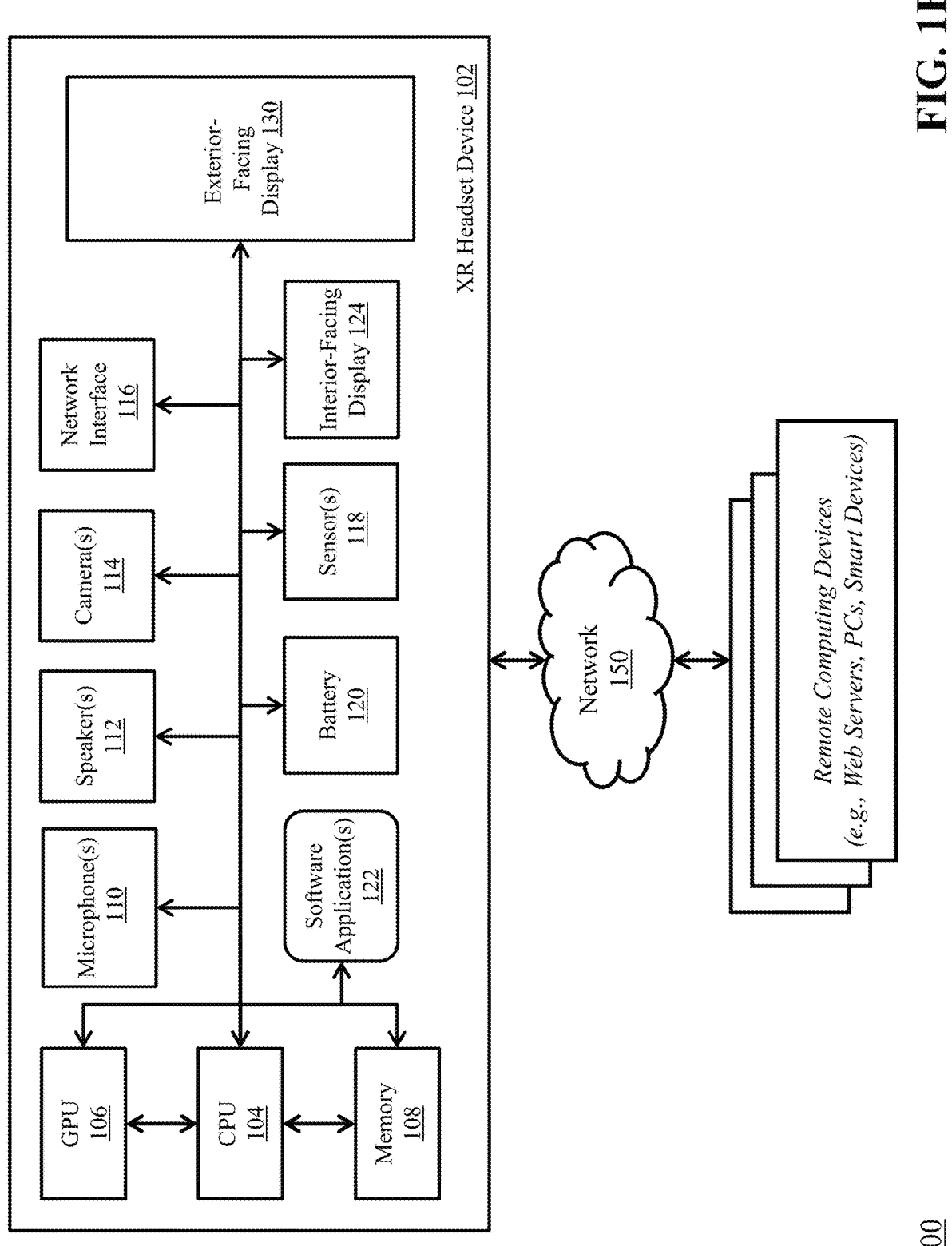
FIG. 1B is a block diagram of a system including a dual screen XR headset device with an embedded second display screen.

FIG. 1B is a block diagram of a system 100 including the dual screen XR headset device 102 with embedded second display screen 130 from FIG. 1A. As shown in FIG. 1B, the XR headset device 102 comprises a plurality of hardware components that are coupled to each other to execute application software 122. The hardware of the headset device 102 includes a central processing unit (CPU) 104, one or more graphics processing units (GPUs) 106, memory 108 (e.g., solid state/flash RAM), one or more microphones 110, one or more speakers 112, one or more cameras 114 (e.g., cameras facing outward from the headset device that capture the physical environment around the wearer), a network interface 116 (e.g., Bluetooth™, WiFi™) for wirelessly connecting the headset device 102 to network 150, one or more sensors 118 (e.g., accelerometers, gyroscopes, controller sensors, iris trackers), battery 120, application software 122, an interior-facing display apparatus 124 (e.g., one or more micro-OLED displays that can display a virtual environment to the wearer via magnification lenses), and an exterior-facing display screen 130 (e.g., an OLED display with touchscreen capability). In some embodiments, application software 122 comprises one or more specialized sets of computer software instructions programmed onto a processor (e.g., CPU 104, GPU 106) in headset device 102 and can include designated memory locations and/or registers for executing the specialized computer software instructions. For example, application software 122 can include an operating system that is configured to communicate with and operate the hardware components described above, as well as applications that are configured to execute within the operating system to generate, render, and display a virtual environment (including user interface and application control elements) to a wearer of the headset device 102—as well as user interface software that is configured to present graphical information (e.g., images, menus, alerts, notifications, text) on the exterior-facing display screen 130 and capture input received at the display screen 130. As can be appreciated, a person in proximity to the wearer of the headset device 102 can view information presented on the display screen 130 and provide input in the form of gestures (e.g., touches, swipes) on the display screen 130. The headset device 102 can capture and process the input for interaction with, e.g., the virtual environment displayed to the wearer of the headset device 102, as will be described in greater detail throughout the specification.

Network 150 enables the headset device 102 to connect to one or more remote computing devices (e.g., web application servers, personal computers, mobile computing devices, smart devices). Network 150 may be a local network, such as a LAN, or a wide area network, such as the Internet and/or a cellular network. In some embodiments, network 150 is comprised of several discrete networks and/or sub-networks (e.g., cellular to Internet) that enable communication with the headset device 102. For example, headset device 102 can connect via network 150 to one or more server computing devices to, e.g., download application software for installation on the headset device 102 and upload data associated with configuration or operation of the headset device 102, among other functions.

Figure 2A:
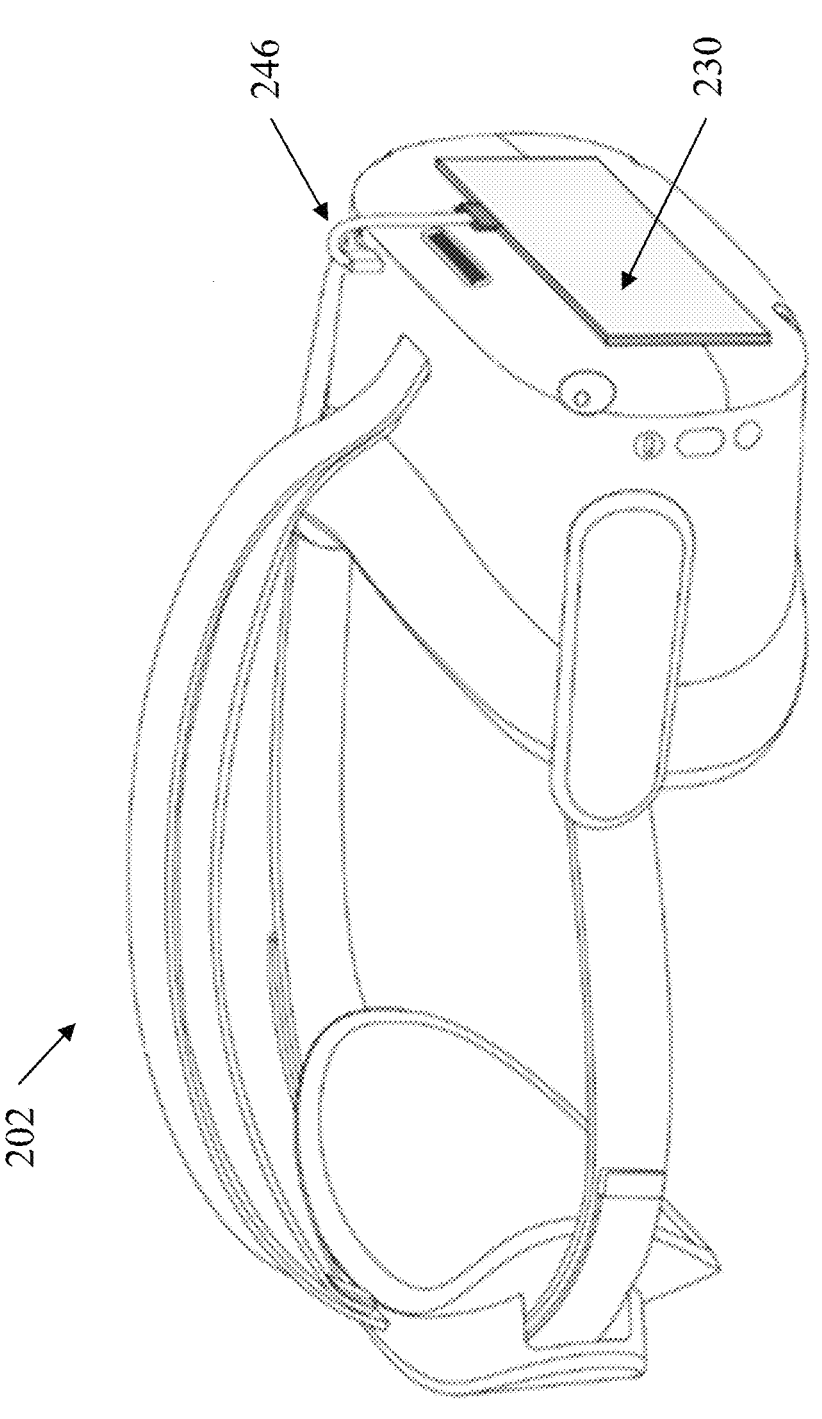
FIG. 2A is a diagram of a dual screen XR headset device with a detachable second display screen apparatus.

FIG. 2A is a diagram of a dual screen extended reality (XR) headset device 202 with a detachable second display screen apparatus 230. As shown in FIG. 2A, the second display screen apparatus 230 is affixed on an exterior surface of the housing of the headset device 102, such that the display is detachable from the headset device and faces outward from the headset device 102. As a result, others in proximity to the wearer of the headset device can view and interact with the second display screen apparatus 230. In this embodiment, the second display screen apparatus 230 includes internal hardware components that are separate from the hardware components of the headset device 202. The second display screen apparatus 230 is coupled to the headset device 202 via power connector 246 (e.g., a USB-C connection cable) to receive power from, e.g., a battery of the headset device 202. In some embodiments, the second display screen apparatus 230 can include a separate battery that provides power to the apparatus 230.

Figure 2B:
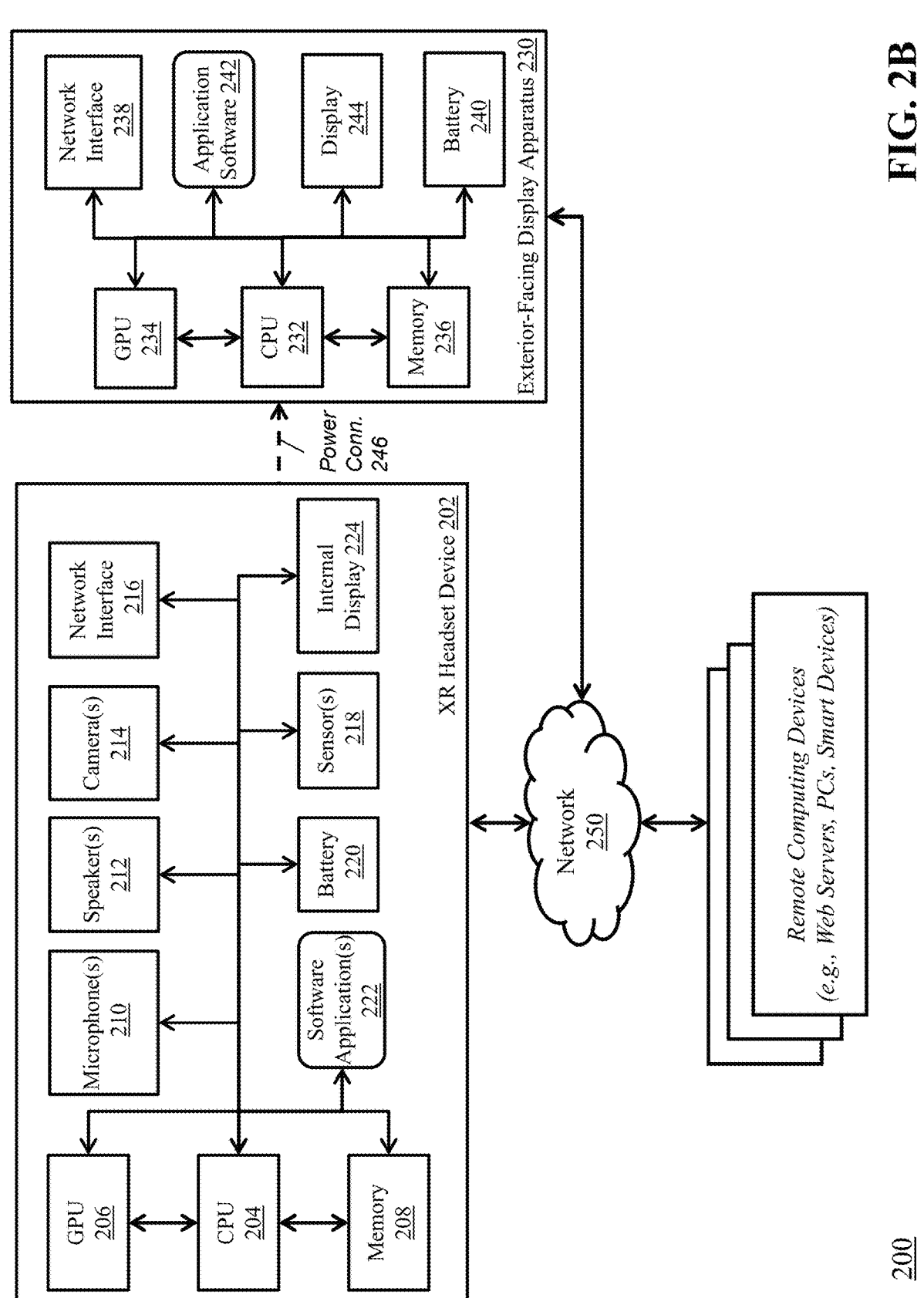
FIG. 2B is a block diagram of a system including a dual screen XR headset device with a detachable second display screen apparatus.

FIG. 2B is a block diagram of a system 200 including the dual screen XR headset device 202 with detachable second display screen apparatus 230 from FIG. 2A. As shown in FIG. 2B, the XR headset device 202 comprises a plurality of hardware components that are coupled to each other to execute application software 222. The hardware of the headset device 202 includes a central processing unit (CPU) 204, one or more graphics processing units (GPUs) 206, a memory 208 (e.g., solid state/flash RAM), one or more microphones 210, one or more speakers 212, one or more cameras 214 (e.g., cameras facing outward from the headset device that capture the physical environment around the wearer), a network interface 216 (e.g., Bluetooth™, Wi-Fi™) for wirelessly connecting the headset device 202 to network 250, one or more sensors 218 (e.g., accelerometers, gyroscopes, controller sensors, iris trackers), battery 220, application software 222, and an interior-facing display apparatus 224 (e.g., one or more micro-OLED displays that can display a virtual environment to the wearer via magnification lenses). The exterior-facing display screen apparatus 230 comprises a central processing unit (CPU) 232, one or more graphics processing units (GPUs) 234, memory 236 (e.g., solid state/flash RAM), a network interface 238 (e.g., Bluetooth™, Wi-Fi™) for wirelessly connecting the apparatus 230 to network 250, a battery 240, application software 242, and a display screen 244 (e.g., an OLED display with touchscreen capability). In some embodiments, application software 222 comprises one or more specialized sets of computer software instructions programmed onto a processor (e.g., CPU 232, GPU 234) in headset device 102 and can include designated memory locations and/or registers for executing the specialized computer software instructions. For example, application software 22 can include user interface software that is configured to present graphical information (e.g., images, menus, alerts, notifications, text) on the display screen 244 and capture input received at the display screen 244. For example, a person in proximity to the wearer of the headset device 202 can view information presented on the display screen 244 and provide input in the form of gestures (e.g., touches, swipes) on the display screen 244. The apparatus 230 can capture and process the input for interaction with the headset device 202, as will be described in greater detail throughout the specification.

In some embodiments, the headset device 202 communicates with the display screen apparatus 230 wirelessly via network 250. For example, each of headset device 202 and display screen apparatus 230 can connect to network 250 (e.g., via Wi-Fi™) and establish a communication channel between the headset device 202 and the apparatus 230 to exchange data relating to execution of one or more applications on the headset device 202. In some embodiments, headset device 202 and display screen apparatus 230 communicate using an application programming interface (API), which enable the transmission and receipt of data using pre-defined function calls. In some embodiments, the headset device 202 and the display screen apparatus 230 can be configured to exchange data in a structured format (e.g., XML, JSON).

In addition, the headset device 202 can be configured to communicate wirelessly with one or more other headset devices in proximity to the device 202. For example, two or more headset devices 202 equipped with a display screen apparatus 230 can establish a short-range communication channel (e.g., pairing) to exchange information and/or perform a variety of application workflows.

As shown in FIGS. 2A and 2B, the display screen apparatus 230 is physically coupled to the headset device 246 via a power connection cable 246 (e.g., USB-C), which enables the apparatus 230 to draw operating power from the battery 220 of the headset device 202. It should be appreciated that in some embodiments, the display screen apparatus 230 is configured to include a separate battery 240 that powers the apparatus 230—thereby making the power connection 246 optional. In some embodiments, the batteries 220 and 240 are rechargeable lithium batteries.

Also, in some embodiments the display screen apparatus 230 is detachably mounted to the exterior surface of the headset device 202 using any of a number of different mechanisms, including but not limited to: self-fastening strips (e.g., VELCRO®), snap-lock fasteners, adhesive strips, or molded hooks or clips.

Network 250 enables the headset device 202 and/or the display screen apparatus 230 to connect to one or more remote computing devices (e.g., web application servers, personal computers, mobile computing devices, smart devices). Network 250 may be a local network, such as a LAN, or a wide area network, such as the Internet and/or a cellular network. In some embodiments, network 250 is comprised of several discrete networks and/or sub-networks (e.g., cellular to Internet) that enable communication with the headset device 202 and/or display screen apparatus 230. For example, the headset device 202 and the display screen apparatus 230 can connect via network 250 to one or more server computing devices to, e.g., download application software for installation and upload data associated with configuration or operation of the headset device 102 and/or display screen apparatus 230, among other functions.

FIG. 3 is a flow diagram of a computerized method 300 of operation of an XR headset device with an embedded external-facing second display screen, such as headset device 102 with display screen 130 of FIGS. 1A and 1B. During operation, the headset device 102 executes (step 302) a software application (e.g., application 122) to generate a virtual environment and display the virtual environment to the wearer of the headset device 102 via a first display screen, e.g., interior display 124 comprising micro-OLED screens embedded inside the housing of the headset device 102. In some embodiments, the virtual environment comprises a virtual reality (VR) environment where the wearer's view of their surrounding physical environment is completely replaced by the virtual environment. In some embodiments, the virtual environment comprises an augmented reality (AR) or mixed reality (MR) environment where the wearer sees elements of both the surrounding physical environment and a virtual environment. As can be appreciated, the virtual environment can include one or more objects, e.g. three-dimensional virtual objects positioned within the environment and with which the wearer can interact. The software application 122 can further display user interface elements to the wearer (e.g., menus, icons, buttons, etc.) so that the user can perform a variety of functions, such as configuring the headset device 102, switching between applications 122, providing input to the executing software application 122, and so forth. Also, the wearer can use the headset device 102 and/or one or more controllers coupled to the headset device 102 to move within the virtual environment.

As the wearer of the headset device 102 interacts with the software application 122 being executed, the headset device 102 captures (step 304) one or more of: (i) data associated with execution of the software application 122; (ii) data associated with the virtual environment being displayed to the wearer on the first display screen 124; and (iii) data associated with the wearer of the headset device 102.

Generally, data associated with execution of the software application comprises technical data corresponding to the headset hardware components and/or software application 122 during execution of the application. In some embodiments, data associated with execution of the software application includes, but is not limited to, a frame rate associated with the software application 122 (i.e., number of frames per second (FPS) being rendered by the software application), a processor usage associated with the software application 122 (e.g., expressed as a percentage of the total processing capacity of CPU 104 and/or GPU 106 that is being used by the software application), a memory usage associated with the software application 122 (e.g., expressed as a percentage of the total capacity of memory 108 that is being used by the software application), a network bandwidth usage associated with the software application 122 (e.g., expressed as an upload rate and/or download rate (Mbps) associated with transmission of data to headset device from network 150 or vice versa that is associated with the software application), a version number of the software application 122, a time remaining associated with the software application 122 (e.g., an amount of time that the software application will execute before ending/terminating and being inaccessible to the wearer), or an error message associated with the software application 122 (e.g., either an external error message that is displayed to the wearer during execution of the software application or an internal error message that is not displayed to the wearer).

Generally, data associated with virtual environment being displayed to the wearer on the first display screen 124 comprises characteristics of the user interface and/or aspects of the virtual environment that is being displayed to the wearer on the first display screen 124. In some embodiments, data associated with virtual environment being displayed to the wearer includes, but is not limited to, indicia associated with one or more objects in the virtual environment or indicia associated with a user position in the virtual environment. For example, during execution of the software application 122, the headset device 102 can periodically or continuously record a state of the virtual environment currently being displayed to the wearer-including data such as x-y-z coordinates associated with the wearer's position in the virtual environment, x-y-z coordinates associated with a position of one or more objects in the virtual environment, pose information for the objects in the virtual environment, field of view information for the wearer's position in the virtual environment, among other aspects. In some embodiments, the headset device 102 can capture one or more screenshots of the virtual environment as displayed to the wearer during execution of the software application 122—these screenshots can optionally include user interface features (e.g., alerts/error messages, menus, icons, input elements, etc.) that are integrated into and/or overlaid on the virtual environment. In some embodiments, the headset 102 can generate a stream or broadcast of the virtual environment in real time as the wearer is interacting with the environment.

Generally, data associated with the wearer of the headset device 102 comprises input submitted by the wearer of the headset device to an interface of the headset device. In some embodiments, data associated with the wearer includes, but is not limited to, user profile information (e.g., account ID, user ID, demographics, preferences, historical application usage), authentication credentials (e.g., password, PIN, token), biometrics, and user input and/or interactions with the software application 122 or virtual environment. In some embodiments, the headset device 102 can capture user input provided by the wearer during interaction with the virtual environment-such as cursor movement in the virtual environment, button presses/clicks (e.g., interactions with virtual UI elements and/or with controllers coupled to the headset), text input, voice input (e.g., phrase(s) spoken by the wearer and recorded by microphone(s) 110), and user attention/gaze position (e.g., via eye tracking features).

Figure 4:
FIG. 4 is a diagram of an exemplary user interface generated by an XR headset device for display on an external-facing second display screen of the headset device.

As mentioned above, the headset device 102 is configured to capture one or more of the above-described types of data during execution of the software application 122. The headset device 102 generates (step 306) a user interface based on at least a portion of the captured data and displays the generated user interface on the second, external-facing display screen 130 of the headset device 102. FIG. 4 is a diagram of an exemplary user interface 400 generated by the headset device 102 for display on the second display screen 130 of the headset device. As shown in FIG. 4, the user interface 400 includes a first area 402 comprising a screenshot of the virtual environment being displayed to the wearer on the first display screen 124 or a live stream of the virtual environment being displayed to the wearer on the first display screen 124 (as captured by the headset device 102). The virtual environment includes a plurality of virtual objects 404a, 404b as well as a cursor object 404c (e.g., a hand) that tracks position and movement of the wearer's hand so that the wearer can interact with the virtual objects by gesturing and moving their hands in front of them. In this example, the wearer is grasping the virtual object 404a. The user interface 400 also includes a second area 406 that comprises a message associated with execution of the software application 122 and/or virtual environment displayed to the wearer. In this example, the wearer has encountered an error while interacting with the virtual environment—the wearer is unable to pick up the object 404a. As can be appreciated, this type of error may occur due to any number of different reasons, such as a bug in the software application 122, an error in executing the software application 122 by the headset device 102, or an issue with one or more components of the headset device 122, among others. The message displayed in area 406 indicates that the wearer is stuck while attempting to perform an action. The area 406 further includes a button 408 that enables a person in proximity to the wearer to reset the virtual environment—helping the wearer to get 'unstuck' and continue exploring the virtual environment.

As mentioned above, a person viewing the second display screen 130 can read the message displayed in area 406 and interact with the user interface 400 (i.e., tap button 408) to assist the wearer. The headset device 102 detects (step 308) the input associated with the user interface 400 displayed on the second display screen 130 and interprets the input to generate one or more programmatic instructions for ingestion by the software application 112 being executed by the headset device 102. For example, upon detecting the button 408 tap, the CPU 104 and/or GPU 106 of the headset device 102 generates one or more instruction(s) to the software application 122 to reset the wearer's position, reset one or more of the virtual objects, or perform another operation to change an aspect of the virtual environment and/or the software application 122 so that the wearer can continue.

The headset device 102 executes the instruction(s) to update (step 310) one or more of (i) the virtual environment and (ii) access to one or more features of the software application 122 based upon the detected input from the second display screen 130. In one example, the software application 122 is programmed with one or more hooks that enable the application to receive input from the second display screen 130 (or programmatic instructions based upon the input) for the purpose of modifying the behavior of the virtual environment and/or the software application 122 features. As mentioned above, the headset device 102 can change an aspect of the virtual environment and/or the software application 122 to assist the wearer in using the headset device 102 upon interpreting the detected input from the second display screen 130.

In some embodiments, the headset device 102 executes the instruction(s) to perform one or more actions that relate to operating system features or hardware features of the headset device 102. For example, the input detected from the second display screen 130 can cause the headset device 102 to reboot (i.e., power down and power back up), restart the operating system, log into (or out of) a user account on the headset, or manage other software applications on the device 102. In addition, in some embodiments, the second display screen 130 can be configured to display hardware-level or operating system-level information (e.g., battery charge level, network connection strength, application loading status, etc.).

As can be appreciated, the methods and techniques described above can similarly be applied to the hardware configuration of FIGS. 2A and 2B, where the headset device 202 is a separate physical component from the exterior-facing display apparatus 230. In the embodiment of FIGS. 2A and 2B, the exterior-facing display apparatus 230 is communicably coupled to the headset device 202 via network 250, but the module 230 includes its own separate hardware components-which enables models of existing headset devices that do not have an exterior-facing screen to benefit from the methods described herein. FIG. 5 is a flow diagram of a computerized method of operation of an XR headset device that is coupled to a separate apparatus comprising an external-facing display screen, such as headset device 202 with apparatus 230 of FIGS. 2A and 2B.

As described above, during operation the headset device 202 executes a software application (e.g., application 222) to generate a virtual environment and display the virtual environment to the wearer of the headset device 202 via a first display screen, e.g., interior display 224 comprising micro-OLED screens embedded inside the housing of the headset device 202. As the wearer of the headset device 202 interacts with the software application 222 being executed, the headset device 202 captures one or more of: (i) data associated with execution of the software application 222; (ii) data associated with the virtual environment being displayed to the wearer on the first display screen 224; and (iii) data associated with the wearer of the headset device 202. In some embodiments, the headset device 202 generates a user interface screen based upon the captured data (see, e.g., FIG. 4) and transmits the user interface screen to the exterior-facing display apparatus 230 via network interface 216 and network 250. In some embodiments, the headset device 202 transmits at least a portion of the captured data to the apparatus 230 via network interface 216 and network 250, and the apparatus 230 generates a user interface screen based upon the captured data.

In either embodiment, the exterior-facing display apparatus 230 receives (step 502) user interface data (either a UI screen or captured data) from the processor (e.g., CPU 204, GPU 206) of the headset device 202. The apparatus 230 displays (step 504) a user interface based on the received user interface data on the display screen 244 to one or more other persons in proximity to the wearer of the headset device 202. The apparatus 230 detects (step 506) input associated with the user interface displayed on screen 244, where the input is provided by either the wearer of the headset device or the persons in proximity to the wearer. The apparatus 230 then generates and transmits (step 508) instructions based upon the detected input to the processor(s) 204, 206 of the headset device 202 via the network interface 238 and network 250. The instructions cause the headset device 202 to update one or more of (i) the virtual environment displayed by the device to the wearer and (ii) access to one or more features of a software application 222 executing on the headset device 202.

As can be appreciated, the methods and systems described herein are applicable to a wide array of use cases and workflows that take advantage of the technical benefits provided by the external-facing second screen. Several of these use cases and workflows are described below. These use cases are not exhaustive; other use cases or applications of the technology not expressly described herein may be contemplated within the scope of technology. Also, for simplicity of description, the use cases and workflows described below are illustrated using the hardware configuration of FIGS. 1A and 1B. However, the use cases and workflows can be alternatively implemented using the hardware configuration of FIGS. 2A and 2B.

Collaborative Interaction, Assistance, and Real-Time Monitoring

The methods and systems described herein can enable the performance of collaborative interactions, assistance, and real-time monitoring of a wearer during use of a headset device 102 and execution of a software application 122 on the headset device. The exterior-facing screen 130 can be configured to display a screenshot or stream of the virtual environment being displayed to the wearer via the interior-facing display screen 124, which allows others (such as trainers or assistants) near the wearer to see what the wearer sees. This facilitates real-time help and guidance for the wearer during interaction with the virtual environment—without requiring the wearer to take off the headset device 102 or otherwise have their session interrupted to receive assistance.

In this use case, the processor(s) 104, 106 of the headset device 102 are configured to capture a representation of the interior-facing display 124. For example, the processor(s) can execute a camera function that records a snapshot or stream of the display screen generated by the software application 122. In some embodiments, the snapshot or stream comprises one or more images or frames corresponding to the application display. The processor(s) encode the raw images captured from the application 122 and transmit the encoded images to the exterior-facing display 130 (e.g., frame-by-frame). In some embodiments, encoding can include compression of the images, conversion of the images to another format, changing the resolution of the images, conversion of stereo images into a single image, etc. In the hardware embodiment of FIGS. 2A and 2B, the encoded images are transmitted to the apparatus 230 using the network interface 216 and network 250. The exterior-facing display 130 receives the encoded images and decodes the images for display to an external user via a user interface.

One example of collaborative assistance is described above with respect to FIG. 4, where a wearer of the headset device 102 is stuck in the virtual environment and a person nearby can quickly interact with the external-facing display screen 130 to provide assistance. Other examples of collaborative assistance workflows include:

Including an "admin" or "help" button as a primary element on the user interface of the external-facing display 130: similar to the example of FIG. 4, when a trainer or assistant interacts with the admin/help button, the headset device 102 (and/or apparatus 230) can generate an administration user interface to display a plurality of functions to the trainer. These functions are capable of adjusting the virtual environment and/or software application on the headset device to assist the user—e.g., reset a scene, teleport the wearer to a correct position/location within the virtual environment, etc.

Showing the status of a software application executing on the headset device: the external-facing display screen 130 (or display screen 244 of apparatus 230) can display a user interface that includes an amount of time remaining for execution of a software application 122 on the headset device 102. As can be appreciated, the wearer of the headset device 102 may be interacting with a software application 122 where the wearer only has a limited window to use the software (e.g., a demo station at a trade show). The headset device 102 can be configured to track and record an amount of time elapsed upon the initial execution of the software application 122 by the wearer (e.g., clicking a program launch icon displayed on the internal display screen 124). Concurrently, the headset device 102 can generate a user interface for display on external-facing display 130 that includes the amount of time elapsed (and/or an amount of time remaining) to personnel that are managing the demo station. As a result, the personnel can look at the screen 130 to quickly assess whether the wearer's allotted time to use the headset device 102 has ended without unduly interrupting the wearer's interaction with the software application. In some embodiments, the amount of time elapsed/remaining can also be displayed to the wearer via a user interface element on the internal display screen 124.

Translating spoken or typed language between the wearer and the assistant: in the event that the wearer of the headset device 102 speaks a different language than a person assisting them with use of the headset device/software application, the internal-facing display 124 and the external-facing display 130 can advantageously display translated speech to the wearer and the assistant, respectively. In some embodiments, the wearer can speak a phrase in a first language (e.g., English) that is captured by the microphone(s) 110 of the headset device 102 and stored in memory 108 as a digital audio segment or file, or type a text phrase in the first language into a user interface element displayed in the virtual environment. The software application 122 can convert the digital audio to text as needed (using, e.g., a speech-to-text algorithm), translate the text from the first language to a second language (e.g., Dutch) using a translation algorithm, and generate a user interface for display on the external-facing display screen 130 that comprises the translated text in the second language. The assistant can quickly understand the wearer and facilitate any assistance that is needed. Similarly, the assistant can interact with the external display screen 130 (e.g., enter a text response in the second language, press a button corresponding to a pre-stored response in the second language) and/or speak a response in the second language that is captured by the microphone(s) 110 and stored as another digital audio segment or file. The headset device 102 can convert the digital audio to a text response (as needed), translate the text response from the second language into the first language, and generate a user interface element for display to the wearer on the internal display screen 124 that comprises the translated text in the first language.

Providing interactive public engagement: the external-facing display screen 130 can also be configured to display information about the software application 122 that is executing on the headset device 102 during use by the wearer (including, but not limited to, screenshot(s) or streams of what the wearer is seeing). Other persons in proximity to the wearer (e.g., bystanders) can view and engage with the displayed content as well. For example, the headset device 102 can be configured to display on the external-facing display screen 130 a menu of options for actions for the wearer to take when interacting with the virtual environment (e.g., 'open the blue door,' 'climb the ladder,' etc.). A bystander can interact with the external display 130 by selecting one of the options from the menu. The headset device 102 can receive the selected option and modify a state of the software application 122 and/or virtual environment to account for the selected option. For example, if the bystander selects 'climb the ladder,' the headset device 102 can automatically move the wearer's avatar in the virtual environment to a ladder object displayed in the environment and execute an animation that shows the avatar climbing the ladder. In some embodiments, as an alternative to automatically modifying the state of the virtual environment, the headset device 102 can display a message to the wearer via the internal display 124 that describes the selected option. Then, the wearer can decide to follow the option described in the message or take a different action.

Displaying customized logos, graphics, avatars: when the external-facing display screen 130 is not actively displaying a help screen or other information that is used by an assistant, the headset device 102 can be configured to display a user interface on the external display screen 130 that includes customized visual elements such as company or team logos, player avatars, colors, advertisements, or other custom images.

In some embodiments, the assistant can operate a separate computing device (e.g., smartphone, tablet, laptop) that is configured to communicate wirelessly with the headset device 102/202 and/or apparatus 230 to exchange information. For example, the assistant can launch an application on their smartphone that connects to each of the headset devices in proximity to the assistant and capture relevant status or operating information from each of the headsets. The smartphone application can display the captured information in a visual format to the assistant, who can quickly understand the state of each of the headsets and take action as necessary. In another example, the assistant can use their smartphone to scan the externally-facing display screen of one or more headsets (e.g., which is displaying a QR code encoded with operational information of the headset) and receive the operational information. In some embodiments, the assistant can wear their own headset device 102/202 which wirelessly connects to (and/or scans) one or more other headsets in a similar fashion.

Privacy-Enhanced Software Interactions, Authentication, and Headset Configuration The methods and systems described herein can beneficially provide a secure mechanism for privacy-enhanced application workflows, such as interactions with the software application 122 and/or virtual environment, device/wearer authentication, and headset hardware or software configuration. The exterior-facing screen 130 can be configured to display a user interface to enable the wearer of the headset device 102 and/or another person in proximity to the wearer to activate certain software application features, authenticate the wearer of the headset, or automatically configure hardware or software resources on the headset device 102.

Figure 6:
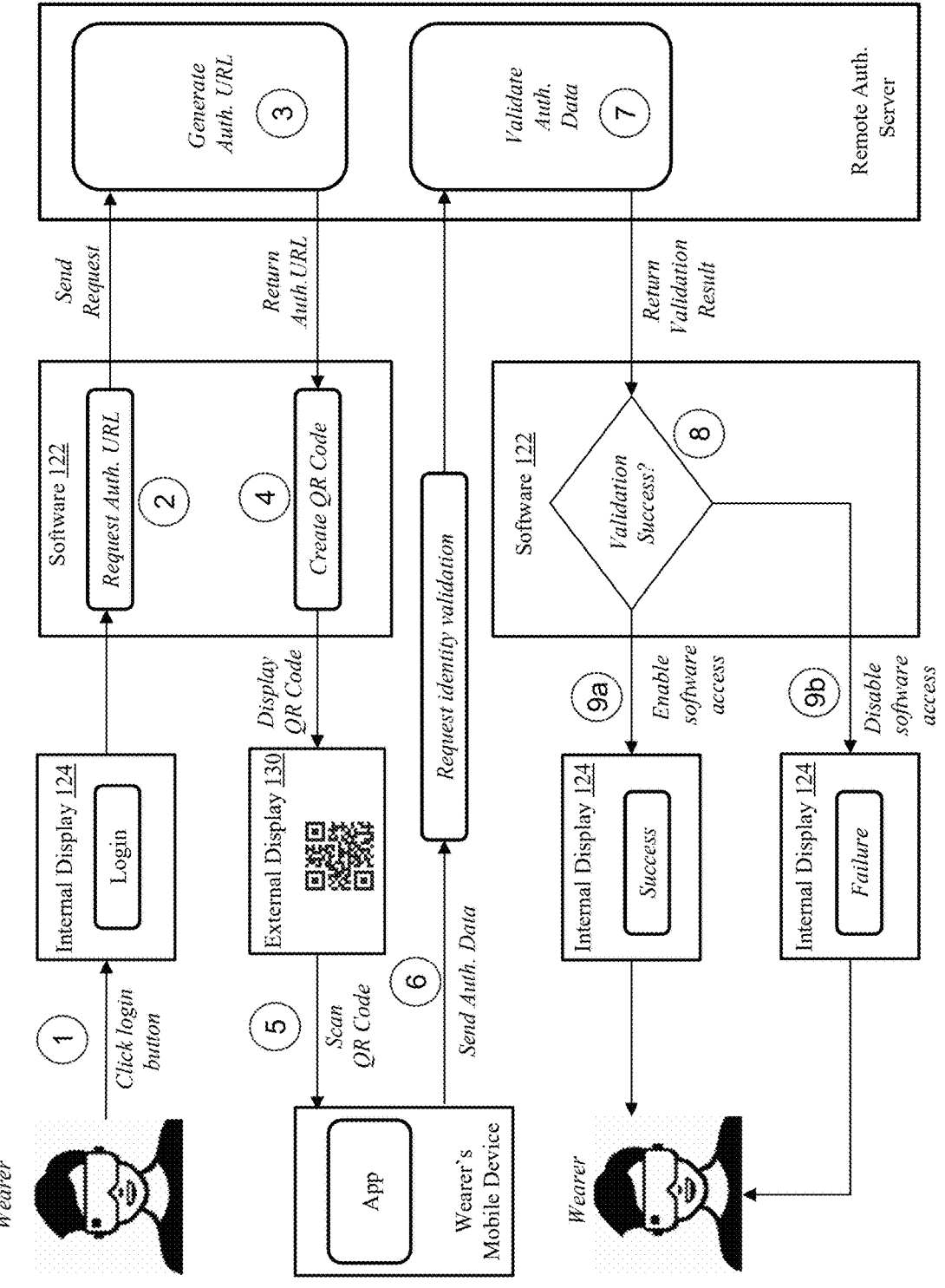
FIG. 6 is a workflow diagram of a computerized method of multi-factor authentication using a dual screen XR headset device.

FIG. 6 is a workflow diagram of a computerized method 600 of multi-factor authentication using a dual screen XR headset device. As can be appreciated, the method 600 can be performed by either the headset device 102 of FIGS. 1A and 1B or the headset device 202 of FIGS. 2A and 2B.

The wearer of the headset device 102 may want to execute a particular software application 122 and/or access certain features of a software application 122 on headset device 102. To do so, the wearer may be required to complete a multi-factor authentication (MFA) process before the headset will enable access to the software features. Typical MFA processes involve the use of a second computing device (e.g., a smartphone or other mobile device). In these processes, a user provides a first set of authentication credentials (e.g., username and password) via a first computing device (e.g., headset device 102). An authentication server receives the first set of authentication credentials from the first computing device and validates the credentials. Then, the authentication server issues a secondary authentication challenge to the user that must be successfully completed before the user is fully authenticated.

In some implementations, the secondary authentication challenge comprises a unique code (e.g., six-digit number, quick response (QR) code) that is transmitted from the authentication server to the first computing device and displayed to the user. The user must then enter the six-digit number into a user interface on (or scan the QR code using a camera function of) an application ('app') executing on a different computing device associated with the user-usually a mobile computing device such as a smartphone. The mobile computing device sends the data entered or scanned by the user back to the authentication server. If the unique code provided by the user matches the unique code that was generated by the authentication server and sent to the user, then the authentication server sends authentication success indicia back to the first computing device, which enables user access to the requested software application or software function. If the unique code provided by the user does not match the unique code generated by the authentication server, then the authentication server sends authentication failure indicia back to the first computing device, which disables user access to the requested software application or software function.

As can be appreciated, the wearer of the headset device 102 may be required to remove the headset to, e.g., launch a separate app on their smartphone, authenticate to the app, and complete a typical multi-factor authentication process as described above. This process can be very disruptive to the wearer's experience with the headset device 102 and virtual environment.

Instead of requiring the wearer to remove the headset, the method 600 of FIG. 6 enables seamless multi-factor authentication for the wearer through use of the external-facing display screen 130. As shown in FIG. 6, the wearer of the headset device 102 interacts with a software application 122 executing on the headset device in a way which requires the wearer to complete an MFA process. Upon triggering the MFA process, the software application 122 displays a login user interface element to the wearer via the internal display screen 124. In this example, the user interface element comprises a login button. Other user interface elements can include, but are not limited to, text fields for entry of a username/password, gesture capture elements, etc. In the example of FIG. 6, at step 1 the wearer clicks the login button on internal display screen 124. Upon detecting that the login button has been clicked, at step 2 the software application 122 generates a request for an authentication URL and sends the request to a remote authentication server (e.g., via network interface 116 and network 150). In some embodiments, the software application 122 captures authentication credentials associated with the wearer and transmits the authentication credentials to the authentication server along with the request for an authentication URL. For example, the software application 122 can capture user input from the internal display screen 124 that comprises a username and password. In another example, the software application 122 can retrieve authentication credentials for the wearer that are stored in the memory 108 of the headset device 102.

Upon receiving the request for an authentication URL, at step 3 the remote authentication server generates an authentication URL for the wearer. In some embodiments, the authentication URL comprises a HTTP or HTTPS address that points to a resource or function hosted by an authentication server for completion of the user authentication process. The authentication URL that is generated by the authentication server can be unique to the wearer and/or to the specific authentication request for the wearer. In some embodiments, the authentication URL includes a unique code or numeric value generated by the authentication server, which the authentication server expects to receive back as part of the secondary challenge in order to successfully authenticate the wearer. The remote authentication server then sends the generated authentication URL back to the headset device 102.

The software application 122 receives the generated authentication URL and, at step 4, the software application 122 creates a QR code based on the URL. For example, the software application 122 can encode the alphanumeric string of the URL into a corresponding arrangement of squares of a QR code that represents the URL. The software application 122 displays a user interface including the QR code on the external-facing display screen 130 of the headset device 102.

Without removing the headset, the wearer can simply open an app on their mobile computing device (e.g., smartphone) and scan the QR code on the external display screen 130 using, e.g., a camera of the mobile device. In some embodiments, the wearer holds the mobile device near the external display screen 130 so that a field of view of the mobile device's camera captures the displayed QR code. The app of the mobile computing device is configured to automatically scan the QR code, convert the QR code into the corresponding authentication URL, and at step 6 activate the URL to send an identity validation request to the remote authentication server. In some embodiments, the identify validation request includes authentication data (e.g., authentication request ID, user ID, unique code, credential data)— for example, the mobile computing device can insert the authentication data into the URL as in-line parameters for ingestion by the remote authentication server.

The remote authentication server receives the identity validation request from the mobile computing device and, at step 7, the authentication server validates the identity validation request (including any authentication data) and returns a validation result to the headset device 102. If the authentication data in the validation request matches the expected authentication data, the remote authentication server returns validation success indicia to the headset device 102. If the authentication data in the validation request does not match the expected authentication data, the remote authentication server returns validation failure indicia to the headset device 102.

At step 8, the software application 122 receives the validation result from the remote authentication server. As mentioned above, if the validation result comprises validation success indicia, the software application 122 can enable the execution of and/or access to particular software features requested by the wearer and, at step 9a, display a success message to the wearer via the internal display screen 124. If the validation result comprises validation failure indicia, the software application 122 can disable or prevent the execution of and/or access to particular software features requested by the wearer and, at step 9b, display a failure message to the wearer via the internal display screen 124.

One example of privacy-enhanced software interactions, authentication, and headset configuration is described above with respect to FIG. 6. Other examples of privacy-enhanced software interactions, authentication, and headset configuration workflows include:

Creating and displaying application workflow shortcuts: the headset device 102 can be configured to display user interface elements that correspond to shortcuts for frequently-performed software application tasks, such as logging into services or switching virtual environments/applications on the headset device 102. For example, the headset device 102 can display a menu of shortcuts on the external-facing display screen 130, where one of the shortcuts relates to launching a specific software application on the headset device 102. Instead of having to put on the headset and use the internal display screen 124 to launch the software, a trainer or assistant viewing the external screen 130 can simply select the appropriate shortcut from the menu. The headset device 102 detects activation of the shortcut and executes programmatic instructions to (i) close any other active software applications on the headset device 102 and (ii) launch the specific software application (if not already active).

Performing software administration tasks: in some circumstances, installing or upgrading software applications on headset devices requires approval from an organization's information technology (IT) department. The headset device 102 can be configured to complete software administration processes using the external-facing display screen 130. For example, the wearer of the headset device 102 may want to install a new software application (or update an existing software application to a new version) that requires IT department approval. The wearer of the headset device 102 can interact with the headset device 102 via the internal display screen 124 to initiate a request for software installation/updating. Upon detecting the request, the headset device 102 can generate and display a user interface on the external-facing display screen 130 that enables IT support personnel in proximity to the wearer to provide approval for the requested software changes. In some embodiments, the IT personnel can enter authentication data (e.g., PIN, password, token) using the external-facing display screen 130 as part of the approval process. The headset device 102 can then automatically complete the software installation without requiring the wearer to remove the headset.

Effectuating secure transactions: in addition, the external-facing display screen 130 can be beneficial for completion of secure, sensitive transactions using the headset device 102. For example, the wearer of the headset device 102 may want to execute a transaction (e.g., purchase, funds transfer, etc.) that requires the submission of sensitive or confidential information (e.g., credit card number, wallet phrase for a cryptocurrency transaction). Instead of requiring the wearer to submit the sensitive information via the internal display screen 124 (which may be cumbersome or unsecure), the headset device 102 can enable the wearer to transfer the sensitive information directly via the external display screen 130. In one example, the external display screen 130 or apparatus 230 can be configured with short-range wireless communication interface hardware (e.g., Bluetooth®, near-field communication (NFC)). When another computing device, such as the wearer's smartphone, is held in proximity to the external display screen 130 or apparatus 230, the smartphone can automatically establish a secure communication channel with the display 130 or apparatus 230 using the short-range wireless protocol. Then, the smartphone can send an encrypted version of the sensitive information to the screen 130 or apparatus 230 over the secure communication channel. The headset device 102 can decrypt the sensitive information and complete the requested transaction, without requiring the wearer to remove the headset or provide any sensitive information via the internal display 124.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

The computer program can be deployed in a cloud computing environment (e.g., Amazon® AWS, Microsoft® Azure, IBM® Cloud™). A cloud computing environment includes a collection of computing resources provided as a service to one or more remote computing devices that connect to the cloud computing environment via a service account-which allows access to the aforementioned computing resources. Cloud applications use various resources that are distributed within the cloud computing environment, across availability zones, and/or across multiple computing environments or data centers. Cloud applications are hosted as a service and use transitory, temporary, and/or persistent storage to store their data. These applications leverage cloud infrastructure that eliminates the need for continuous monitoring of computing infrastructure by the application developers, such as provisioning servers, clusters, virtual machines, storage devices, and/or network resources. Instead, developers use resources in the cloud computing environment to build and run the application and store relevant data.

Method steps can be performed by one or more processors executing a computer program to perform functions of the invention by operating on input data and/or generating output data. Subroutines can refer to portions of the stored computer program and/or the processor, and/or the special circuitry that implement one or more functions. Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Exemplary processors can include, but are not limited to, integrated circuit (IC) microprocessors (including single-core and multi-core processors). Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), an ASIC (application-specific integrated circuit), Graphics Processing Unit (GPU) hardware (integrated and/or discrete), another type of specialized processor or processors configured to carry out the method steps, or the like.

Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices (e.g., NAND flash memory, solid state drives (SSD)); magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above-described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). The systems and methods described herein can be configured to interact with a user via wearable computing devices, such as an augmented reality (AR) appliance, a virtual reality (VR) appliance, a mixed reality (MR) appliance, or another type of device. Exemplary wearable computing devices can include, but are not limited to, headsets such as Meta™ Quest 3™ and Apple® Vision Pro™. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN),), a private IP network, an IP private branch exchange (IPBX), a wireless network (e.g., radio access network (RAN), Bluetooth™, near field communications (NFC) network, Wi-Fi™, WiMAX™, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), cellular networks, and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE), cellular (e.g., 4G, 5G), and/or other communication protocols.

Devices of the computing system can include, for example, a computer, a computer with a browser device, a telephone, an IP phone, a mobile device (e.g., cellular phone, personal digital assistant (PDA) device, smartphone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Safari™ from Apple, Inc., Microsoft® Edge® from Microsoft Corporation, and/or Mozilla® Firefox from Mozilla Corporation). Mobile computing devices include, for example, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The methods and systems described herein can utilize artificial intelligence (AI) and/or machine learning (ML) algorithms to process data and/or control computing devices. In one example, a classification model, is a trained ML algorithm that receives and analyzes input to generate corresponding output, most often a classification and/or label of the input according to a particular framework.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. An extended reality (XR) headset device comprising:
a first display screen embedded in the headset device and viewable by a wearer of the headset device;
a second display screen integrated into an external surface of the headset device and viewable by one or more other persons in proximity to the wearer of the headset device;

a memory that stores computer-executable instructions; and a processor that executes the computer-executable instructions to:
execute a software application to generate a virtual environment and display the virtual environment to the wearer of the headset device via the first display screen;
capture one or more of (i) data associated with execution of the software application, (ii) data associated with the virtual environment being displayed to the wearer, and (iii) data associated with the wearer of the headset device;
generate a user interface based upon at least a portion of the captured data and display the user interface on the second display screen;
detect input associated with the user interface displayed on the second display screen; and
update one or more of (i) the virtual environment and (ii) access to one or more features of the software application based upon the detected input,
wherein the first display screen and the second display screen are part of a single XR headset device.

2. The headset device of claim 1, wherein the data associated with execution of the software application comprises a frame rate associated with the software application, processor usage associated with the software application, memory usage associated with the software application, network bandwidth usage associated with the software application, a version number of the software application, a time remaining associated with the software application, an application mode of the software application, a user role associated with the software application, a narrative progress of the software application, a state of the software application, and an error message associated with the software application.

3. The headset device of claim 1, wherein data associated with the virtual environment being displayed to the wearer comprises indicia associated with one or more objects in the virtual environment, indicia associated with user position in the virtual environment, and indicia associated with user orientation in the virtual environment.

4. The headset device of claim 1, wherein data associated with the wearer of the headset device comprises input submitted by the wearer of the headset device to an interface of the headset device.

5. The headset device of claim 4, wherein the interface of the headset device comprises a microphone and the input submitted by the wearer comprises a spoken phrase.

6. The headset device of claim 4, wherein the interface of the headset device comprises a user interface element displayed on the first display screen and the input submitted by the wearer comprises an interaction with the user interface element.

7. The headset device of claim 1, wherein the user interface displayed on the second display screen comprises at least a portion of a screen capture of the virtual environment as displayed to the wearer of the headset device via the first display screen.

8. The headset device of claim 7, wherein the user interface displayed on the second display screen comprises a user interface element requesting input from the one or more other persons in proximity to the wearer of the headset device.

9. The headset device of claim 1, wherein the user interface displayed on the second display screen comprises status indicia associated with one or more of the software application, the virtual environment, and the wearer of the headset device.

10. The headset device of claim 1, wherein the input associated with the user interface displayed on the second display screen comprises one or more of a touch interaction and a scan interaction with the second display screen by either the wearer of the headset device or the one or more other persons in proximity to the wearer of the headset device.

11. The headset device of claim 10, wherein updating access to one or more features of the software application based upon the detected input comprises:

authenticating the wearer of the headset device based upon the touch interaction or the scan interaction; and enabling access to the one or more features of the software application based upon the authentication of the wearer.

12. The headset device of claim 1, wherein updating access to one or more features of the software application based upon the detected input comprises modifying one or more objects in the virtual environment.

13. A computerized method, comprising:

executing, by an extended reality (XR) headset device, a software application to generate a virtual environment and display the virtual environment via a first display screen embedded in the headset device and viewable by a wearer of the headset device;

capturing, by the headset device, one or more of (i) data associated with execution of the software application, (ii) data associated with the virtual environment being displayed to the wearer, and (iii) data associated with the wearer of the headset device;

generating, by a second display screen integrated into an exterior surface of the headset device and viewable by one or more other persons in proximity to the wearer of the headset device, a user interface based upon at least a portion of the captured data and displaying the user interface on the second display screen;

detecting, by the headset device, input associated with the user interface displayed on the second display screen; and updating, by the headset device, one or more of (i) the virtual environment and (ii) access to one or more features of the software application based upon the detected input, wherein the first display screen and the second display screen are part of a single XR headset device.

14. The method of claim 13, wherein the data associated with execution of the software application comprises a frame rate associated with the software application, processor usage associated with the software application, memory usage associated with the software application, network bandwidth usage associated with the software application, a version number of the software application, a time remaining associated with the software application, an application mode of the software application, a user role associated with the software application, a narrative progress of the software application, a state of the software application, and an error message associated with the software application.

15. The method of claim 13, wherein data associated with the virtual environment being displayed to the wearer comprises indicia associated with one or more objects in the virtual environment, indicia associated with user position in the virtual environment, and indicia associated with user orientation in the virtual environment.

16. The method of claim 13, wherein data associated with the wearer of the headset device comprises input submitted by the wearer of the headset device to an interface of the headset device.

17. The method of claim 16, wherein the interface of the headset device comprises a microphone and the input submitted by the wearer comprises a spoken phrase.

18. The method of claim 16, wherein the interface of the headset device comprises a user interface element displayed on the first display screen and the input submitted by the wearer comprises an interaction with the user interface element.

19. The method of claim 13, wherein the user interface displayed on the second display screen comprises a screen capture of the virtual environment as displayed to the wearer of the headset device via the first display screen.

20. The method of claim 19, wherein the user interface displayed on the second display screen comprises a user interface element requesting input from the one or more other persons in proximity to the wearer of the headset device.

21. The method of claim 13, wherein the user interface displayed on the second display screen comprises status indicia associated with one or more of the software application, the virtual environment, and the wearer of the headset device.

22. The method of claim 13, wherein the input associated with the user interface displayed on the second display screen comprises one or more of a touch interaction and a scan interaction with the second display screen by either the wearer of the headset device or the one or more other persons in proximity to the wearer of the headset device.

23. The method of claim 22, wherein updating access to one or more features of the software application based upon the detected input comprises:

authenticating the wearer of the headset device based upon the touch interaction or the scan interaction; and enabling access to the one or more features of the software application based upon the authentication of the wearer.

24. The method of claim 13, wherein updating access to one or more features of the software application based upon the detected input comprises modifying one or more objects in the virtual environment.

\* \* \* \* \*